June 28, 1966  K. KORDESCH  3,258,415
OXYGEN ANALYZER AND OXYGEN-DEPOLARIZED CELL THEREFOR
Filed May 11, 1964

INVENTOR.
KARL KORDESCH
BY
ATTORNEY

United States Patent Office 3,258,415
Patented June 28, 1966

3,258,415
OXYGEN ANALYZER AND OXYGEN-
DEPOLARIZED CELL THEREFOR
Karl Kordesch, Lakewood, Ohio, assignor to Union
Carbide Corporation, a corporation of New York
Filed May 11, 1964, Ser. No. 366,237
9 Claims. (Cl. 204—195)

This application is a continuation-in-part of application Serial No. 73,472, filed on November 4, 1960, now abandoned, which is in turn a division of application Serial No. 721,028, filed on March 12, 1958 and now United States Patent No. 2,991,412, issued on July 4, 1961 and entitled, "Oxygen Analyzer."

The invention relates to an oxygen analyzer for determining the concentration of oxygen in a gaseous mixture and to an oxygen-depolarized cell capable of use in such an oxygen analyzer.

Chemical methods for oxygen determination in gases are well known. Most of them are based on the principle of measuring the volume decrease resulting from absorption of combustion reactions. Other methods, more suitable for use in automatic gas analyzers, are based on the physical properties of oxygen, such as its heat of reaction, heat conductivity and paramagnetism.

None of the above methods is entirely specific for oxygen so that appreciable effort together with expensive instrumentation are required to obtain satisfactory results. These problems are further aggravated where complicated gas mixtures must be analyzed, and if automatic control or unattended operation are desired. A need for a simple and selective oxygen analyzer thus exists.

It has already been suggested to use as the principle of operation of oxygen-analyzing equipment, the electrochemical activity of oxygen acting on a carbon or metal electrode, serving as the cathode of a galvanic element, in, for example, the so-called "Fery" cell. This type of cell uses ambient oxygen to depolarize its cathode. As the extent of depolarization depends on the amount of oxygen reaching the cathode-electrolyte interface, it soon becomes obvious that such a cell could be used to determine the oxygen concentration of gases passing therethrough. Contrary to reasonable expectations, the results of this approach have not been too encouraging. In the first place, it was observed that carbon electrodes did not give reproducible results over prolonged periods. Secondly, electrochemical changes, occurring as discharge progresses, were found to cause voltage irregularities which reflected in the accuracy of the instrument readings. Additionally, the circuiting of the analyzer apparatus did not compensate for variable electrical characteristics of the sensing cell, such as internal resistance, or variation of depolarization rate with changing temperatures, with the result that further inaccuracies crept into observed data.

An object of this invention is to provide an oxygen-analyzing instrument characterized by great simplicity of construction and operation, but nevertheless capable of furnishing highly reproducible results over a wide range of oxygen concentrations.

Another and more specific object of this invention is to provide an oxygen depolarized cell capable of use in an oxygen-analyzing instrument of the character described above.

These and other objects and features of the present invention will be more readily apparent as the description thereof proceeds, especially when examined in conjunction with the accompanying drawing, in which.

The invention is an oxygen-depolarized cell capable of use in an oxygen analyzer. Briefly, the cell comprises a porous activated and catalyzed polarizable cathode exposed to the gaseous mixture whose oxygen content is to be measured, an anode and an alkaline electrolyte. The anode may be in the form of finely divided particles which may be incorporated as a coherently bonded body, e.g., an immobilized gel together with the alkaline electrolyte, and may be composed of an anodic material having a voltage between 1.4 volts and 1.2 volts with respect to zinc, but slightly lower than the cathode when the latter is being oxygen depolarized. By use of this type of anode, there is obtained a maximum differential effect when the oxygen concentration in the gaseous mixture changes. The anode may also be made of zinc or equivalent metal and may be incorporated as a separate layer in the cell. The cathode may be composed of carbon having a spinel type catalyst in the pores and at its surface and may be in the form of a flat plate having one surface exposed to the gaseous mixture or it may be tubular shaped defining a passage through which the gaseous mixture is passed.

In the gas analyzer of the invention, there is associated with the cell a voltage measuring means for recording directly the voltage produced by the cell as a measure of the content of oxygen in the gaseous mixture as determined by the partial pressure of oxygen therein. Similarly, further modifications of the device may include a load adjusting means connected in parallel across the cell and compensating for different ranges of partial pressure of oxygen and for variations in cathode polarization resulting from temperature changes. With one version of the cell of this invention, current measuring means can be employed to record the current output of the cell in response to the oxygen content of the atmosphere being analyzed.

In the oxygen-depolarized cell of the invention, the cathode when operating in alkaline electrolyte forms a reversible $H_2O_2$ electrode, the electromotive force of which is a function of the partial pressure of oxygen in the gaseous mixture diffusing to the carbon-electrolyte interface.

The open circuit voltage of an oxygen-depolarized carbon electrode changes in accordance with the Nernst equation, i.e., about 29 mv. per tenfold change in oxygen pressure, a change sometimes strongly influenced by potential changes caused by temperature and humidity fluctuations. The potential of the oxygen electrode under load condition is a more reproducible function of the oxygen supply to the carbon. In addition, equilibrium concentration on the carbon surface is reached quickly because the load current establishes a "dynamic equilibrium" in contrast to the "static equilibrium" measured with a millivoltmeter in the open circuit condition.

Figure 1:
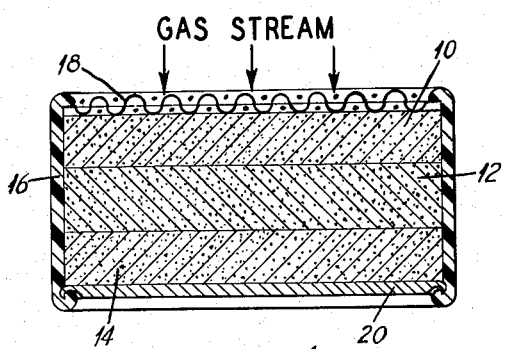
FIG. 1 is a sectional view of an oxygen-depolarized cell embodying the invention.

Referring now to FIG. 1 of the drawing, an oxygen-depolarized cell embodying the invention may comprise an activated and catalyzed, flat plate, porous carbon cathode 10 having one surface so situated as to be readily exposed to the gas stream to be measured, e.g., at the top of the cell, the other surface of the cathode 10 being in contact with the immobilized gelled electrolyte 12, suitably a mixture of potassium hydroxide and a gelling agent. An anode 14 composed of particles of HgO, for instance, compressed into a flat porous mass is located adjacent to and in contact with the other surface of the immobilized gelled electrolyte 12. If desired and especially where the anode-to-cathode distance is very small (on the order of about 1/32 inch), a semi-permeable membrane or separator (not shown) may be placed between the cathode 10 and the anode 14. The electrolyte may be absorbed in this separator. In that case, liquid electrolyte may be used. Suitably, the membrane or separator may be made from cellophane or regenerated cellulose and, in some instances, porous plastic materials, such as polyvinyl copolymers, may be used successfully.

Although the cell elements may be incorporated within most any type of container, the primary requirement of which being that access is provided for the gas stream to be measured to the depolarizing cathode 10, it has been found practical and convenient to encase the cathode 10, gelled electrolyte 12 and anode 14 within an outer tubular sleeve 16 of an electrically non-conductive material, suitably a plastic such as polyethylene. Access of the gas stream to the top surface of the cathode 10 is suitably provided by use of a perforated grid or screen 18. This grid or screen 18 is secured in contact with the cathode 10 by crimping the edges of the tubular sleeve 16 over those of the grid or screen 18. Similarly, a bottom closure plate 20 is secured in contact with the bottom surface of the anode 14. Both the perforated grid or screen 18 and the bottom closure plate 20 are made of an electrically conductive material, suitably a metal such as nickel, and serve respectively as the cathode-collector or positive terminal and anode-collector or negative terminal of the cell. If desired, the cell container may be constructed of metal (e.g., nickel) and may then serve as one electrode terminal, provided that means for insulating the other electrode from the container are included within the cell.

Figure 2:
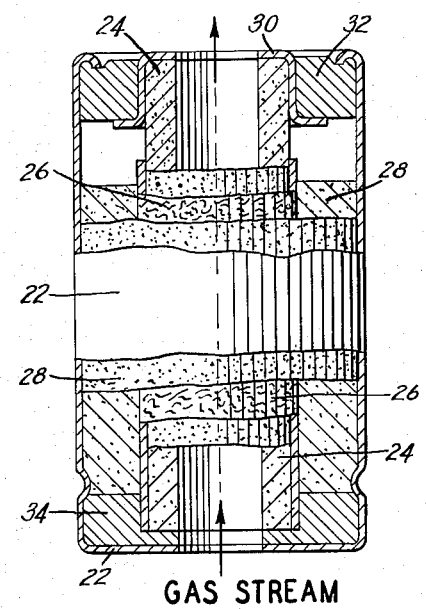
FIG. 2 is a similar view of another embodiment of the cell of the invention.

Another version of the oxygen-depolarized cell of the invention is shown in FIG. 2. This cell is designed to provide for the efficient flow and access of the gas stream to the cathode and to provide an optimum area of cathode surface for contact with the gas during operation of the analyzer. The cell comprises a metal container 22, open at both ends, a tubular activated and catalyzed, porous carbon cathode 24 in the center, through which the gas stream is passed, a separator 26 suitably of a regenerated cellulose material, and a mixture of zinc powder, for instance, KOH and a gelling agent as combined electrolyte and anode 28. If desired, the anode and the electrolyte may be incorporated as separate bodies with the electrolyte absorbed in the separator. A metal cap (tin or silver coated) 30 serves as the cathode-collector or positive terminal. Two insulating members 32 and 34, one of which has a recessed shoulder, separate the cell container 22 from the cathode 24 at its extremities. The bottom of the metal container 22 serves as the negative terminal of the cell.

In the cell of the invention as illustrated in FIGS. 1 and 2, the carbon electrode used preferably delivers a current of 1 to 10 ma./cm.$^2$ of electrode surface without being appreciably polarized. The cathode is treated, before use, according to the processes disclosed in U.S. Patents 2,615,932 or 2,669,598, such that the cathode contains within its pores and at its surface a spinel type catalyst consisting of an oxide of a heavy metal (R) and of aluminum oxide $(RO.Al_2O_3)$. The cathode voltage against zinc is at least 1.2 volts.

The preferred electrolyte is potassium hydroxide for the effect of temperature variations on voltage and current density values is far smaller therewith than it is with NaOH or $NH_4Cl$ electrolytes. Suitable gelling agents for this electrolyte include sodium-carboxymethyl cellulose and starch.

The high surface-powdered amalgamated zinc contained in the electrolyte, in an amount that assures electronic conductivity, performs effectively as an anode. Furthermore, a constant zincate concentration is established since zinc oxide formed during the cell operation precipitates continuously from the saturated electrolyte. A high surface powdered cadmium anode may also be employed instead of zinc.

For use in the analyzer of the present invention, it is preferable to use a special cell of a design conforming generally to that shown in FIGS. 1 and 2, but in which the anode thereof, instead of zinc, is composed of a material having a voltage between 1.4 volts and 1.2 volts with respect to zinc, but slightly lower than the cathode when the latter is being oxygen depolarized. Such materials include, for instance, compressed discharged $MnO_2$, copper oxide and lower nickel oxides. Mercuric oxide may also be used and generally is preferred since it is more readily available and does not have to be in a discharged state as in the case with manganese dioxide. The anode material may be incorporated into a mixture, together with a suitable conductive material such as graphite to improve the electrical conductivity of the mix and a suitable binder such as acetyl cellulose. In the case where discharged $MnO_2$ is used, an inorganic cement binder, e.g., Portland cement, is most preferred. Since the potentials of the carbon cathode and of its companion anode are very close, one obtains a maximum differential effect when the oxygen concentration in the depolarizing atmosphere changes. Example: When air-depolarized, the cell produces only a few millivolts; with pure oxygen the voltage is about 20 millivolts higher. Of course, the exact reading will depend on the anode material selected and other variables. Therefore, the scale of a millivoltmeter can be calibrated to indicate oxygen percent directly. In the cell utilizing an anode of the above metal oxides, the need for a voltage compensating circuit for zero adjustment is eliminated in many cases. The instrument is set to the reference point by applying a small load in series or parallel with the cell.

Figure 3:
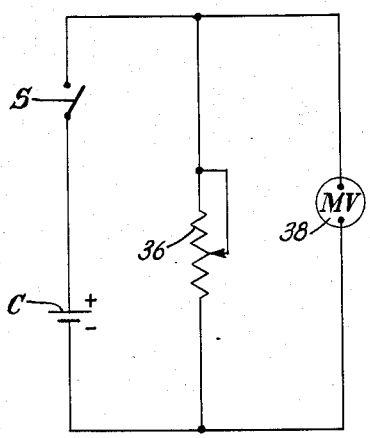
FIG. 3 is a circuit diagram of one embodiment of the oxygen analyzer of the invention.
Figure 4:
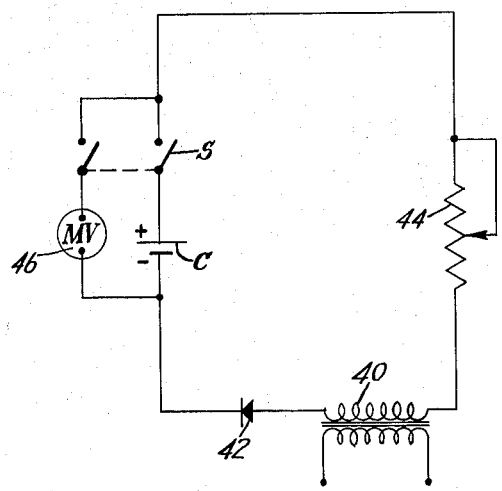
FIG. 4 is a similar diagram of another embodiment of the analyzer of the invention.

In accordance with the present invention, an oxygen-depolarized cell of a general construction described herein and having a metal oxide anode may be used in a number of circuits designed to be responsive to oxygen partial pressure in the gas mixture to be measured as illustrated in FIGS. 3 and 4. The cell of the invention as shown in FIG. 2 and using a metal anode such as zinc is useful in the circuit of FIG. 4 and in those circuits (FIGS. 3, 5 and 6) described and claimed in United States Patent No. 2,991,412 referred to hereinabove.

FIG. 3 illustrates a simple circuit of an oxygen analyzer embodying the invention. As shown, this analyzer comprises a cell C having the preferred anode described above, a variable resistor 36 connected across the cell and having a rating of about 50 ohms, and a millivoltmeter 38. A switch S serves to disconnect the cell C from the circuit. The cell C when the cathode thereof is exposed to the gas stream (air) and under properly adjusted load conditions, will exhibit no potential difference between the depolarized cathode and the metal oxide anode. The analyzer is calibrated with air by adjusting the load across the cell by means of resistor 36, until the millivoltmeter 38 reads zero. Subsequently, the gaseous mixture to be analyzed is passed through the cell C and the percentage of oxygen present therein is read directly on the meter, the variation of voltage being some 29 millivolts per tenfold change in oxygen pressure. To check this device, air may again be passed through the cell C. The millivoltmeter should return to the "air" position (zero) without adjustment of the load.

The above analyzer is portable. It performs best with atmospheres which do not change in oxygen content by more than a factor of ten.

Another simple but somewhat more elaborate analyzer circuit is shown in FIG. 4. Here, the cell C is connected in series with a load circuit comprising a transformer 40 and a rectifier 42 connected in series therewith, this transformer-rectifier combination serving as the polarizing current source. If desired, the transformer 40 and rectifier 42 may be replaced by another suitable D.C. power source, e.g., a battery. A variable resistor 44 may be connected in series with the transformer 40 and rectifier 42 in order to adjust the polarizing current to the proper value when the device is calibrated. A millivoltmeter 46 of high resistance is connected across the cell C and serves as a voltage reading device. The double pole, double throw switch S shown in FIG. 4 serves to disconnect both the cell C and the millivoltmeter 46 from the circuit simultaneously. It may be noted that this analyzer circuit is a pulsed version of that shown in FIG. 3 and that it provides a convenient means of loading the cell. The circuit measures the average voltage of the cell and is different, for example, from the circuit of FIG. 5 in United States Patent No. 2,991,412 where the cell voltage is read during the time that the load resistance is removed.

Operation of this circuit is as follows: The polarizing current source, e.g., transformer 40 and rectifier 42, is switched on, air (or other standardizing atmosphere) is blown to the cathode surface, and switch S is closed. The device is then calibrated by properly adjusting the resistor 44 until the millivoltmeter 46 reads zero. The gaseous mixture to be analyzed is then passed to the cathode and the percentage of oxygen in the mixture is determined from the reading of the meter 46. As indicated above, this circuit may utilize a cell having either a metal (zinc) or metal oxide anode.

The analyzer of this invention will not function properly with gases containing chlorine or oxides of nitrogen in addition to oxygen, because these gases also act as depolarizers. Organic impurities are not critical as long as they do not block the carbon surface as, e.g. carbon disulfide or acetone does, if present in an amount over 1 percent. Since acetylene is highly adsorbed by the carbon, it decreases the sensitivity to oxygen and interferes with accurate measurements. $CO_2$ and $CO$ are not critical under 1 percent. Hydrogen is adsorbed less readily than nitrogen. An instrument which is calibrated with air (78 percent $N_2$) will give a high reading with an oxygen-hydrogen mixture, a fact which must be considered in basic calibration of the scale.

The lowest oxygen content which can be measured is in the magnitude of 0.02 percent oxygen. An accuracy of ±0.01 percent is obtained if a reference gas is used for comparison.

Analysis of nearly pure oxygen (95 to 100 percent $O_2$) requires calibration with oxygen of a known percentage (e.g., from a steel cylinder); an air calibration would be too inaccurate in this case.

As precautionary measure, the gas to be analyzed should pass through a drying and purifying system to remove excess water vapor and $CO_2$ if continuous operation of the instrument is necessary. At the same time, the above enumerated interfering contaminants may be removed by methods well known to those skilled in gasometric analysis.

I claim:

1. An oxygen-depolarized cell which in normal use is capable of sensing the concentration of oxygen in a gaseous mixture and further characterized by an output voltage of only a few millivolts when oxygen depolarized, which comprises a container and in said container, a porous activated carbon cathode having only one surface exposed to said gaseous mixture, said cathode having a spinel type catalyst in the pores and surfaces thereof and having a voltage against zinc of at least 1.2 volts, an alkaline electrolyte and an anode comprising finely divided particles of a material selected from the group consisting of discharged $MnO_2$, copper oxide, mercuric oxide and lower oxides of nickel, said alkaline electrolyte being immobilized between and in contact with said anode and said cathode; and means associated with said container for passing said gaseous mixture into contact with the exposed surface of said cathode.

2. An oxygen-depolarized cell which in normal use is capable of sensing the concentration of oxygen in a gaseous mixture and further characterized by an output voltage of only a few millivolts when oxygen depolarized, which comprises a container and in said container, a porous activated carbon cathode having only one surface exposed to said gaseous mixture, said cathode having a spinel type catalyst in the pores and surfaces thereof and having a voltage against zinc of at least 1.2 volts, an immobilized gel in contact with the other surface of said cathode and comprising an alkaline electrolyte and a gelling agent, and an anode in contact with said immobilized gel and comprising finely divided particles of a material selected from the group consisting of discharged $MnO_2$, copper oxide, mercuric oxide and lower oxides of nickel; and means associated with said container for passing said gaseous mixture into contact with the exposed surface of said cathode.

3. An oxygen-depolarized cell which in normal use is capable of sensing the concentration of oxygen in a gaseous mixture and further characterized by an output voltage of only a few millivolts when oxygen depolarized, which comprises a container and in said container, a porous flat plate activated carbon cathode having only one surface exposed to said gaseous mixture at one end of said container, said cathode having in the pores and surfaces thereof a spinel type catalyst consisting of an oxide of a heavy metal and of aluminum oxide and having a voltage of at least 1.2 volts against zinc, an immobilized gel adjacent to the other surface of said cathode and comprising an alkaline electrolyte and a gelling agent, a semipermeable separator between said cathode and said immobilized gel, and an anode in contact with said immobilized gel and comprising a compressed mass of finely divided particles of a material selected from the group consisting of discharged $MnO_2$, copper oxide, mercuric oxide and lower oxides of nickel, powdered conductive material and a binder; and a perforated, electrically conductive member secured within said end of said container and in contact with the exposed surface of said cathode, said perforated member providing means for passing said gaseous mixture into contact with said cathode and serving as one terminal of said cell.

4. An oxygen-depolarized cell which in normal use is capable of sensing the concentration of oxygen in a gaseous mixture and further characterized by an output voltage of only a few millivolts when oxygen depolarized, which comprises a container and in said container, a porous flat plate activated carbon cathode having only one surface exposed to said gaseous mixture at one end of said container, said cathode having in the pores and surfaces thereof a spinel type catalyst consisting of a heavy metal and of an oxide of aluminum oxide and having a voltage of at least 1.2 volts against zinc, an immobilized gel adjacent to the other surface of said cathode and comprising an alkaline electrolyte, finely divided anodic particles of a material selected from the group consisting of discharged $MnO_2$, copper oxide, mercuric oxide and lower oxides of nickel, and a gelling agent, and a semipermeable separator between said cathode and said immobilized gel; and a perforated, electrically conductive member secured within said end of said container and in contact with the exposed surface of said cathode, said perforated member providing means for passing said gaseous mixture into contact with said cathode and serving as one terminal of said cell.

5. An oxygen-depolarized cell which in normal use is capable of sensing the concentration of oxygen in a gaseous mixture and further characterized by an output voltage of only a few millivolts when oxygen depolarized, which comprises an open electrically conductive container and in said container, a porous tubular activated carbon cathode open at both ends, said cathode having in the pores and surfaces thereof a spinel type catalyst consisting of an oxide of a heavy metal and of aluminum oxide and having a voltage against zinc of at least 1.2 volts, an immobilized gel between said cathode and said container and comprising an alkaline electrolyte, finely divided anodic particles of a material selected from the group consisting of discharged $MnO_2$, copper oxide, mercuric oxide and lower oxides of nickel, powdered graphite and a binder, and a semipermeable separator between said cathode and said immobilized gel; and insulating means for securing said cathode in said container and contact means for making electrical contact with said cathode.

6. An oxygen-depolarized cell which in normal use is capable of sensing the concentration of oxygen in a gaseous mixture, which comprises an open electrically conductive container and centrally disposed in said container, a porous tubular activated carbon cathode open at both ends, said cathode having in the pores and surfaces thereof a spinel type catalyst consisting of an oxide of a heavy metal and of aluminum oxide and having a voltage against zinc of at least 1.2 volts, said cathode being separated from said container and secured therein by insulating members positioned at both ends of said cathode and container, an immobilized gel between said cathode and said container and comprising an alkaline electrolyte, finely divided anodic particles and a gelling agent, and a semipermeable separator between said cathode and said immobilized gel; and an electrically conductive cap having a central opening surrounding one extremity of said cathode intermediate said cathode and one of said insulating members and serving as one terminal of said cell.

7. The oxygen-depolarized cell of claim 6 wherein said anodic particles are composed of zinc.

8. An oxygen-depolarized cell which in normal use is capable of sensing the concentration of oxygen in a gaseous mixture and further characterized by an output voltage of only a few millivolts when oxygen depolarized which comprises a container and in said container, a porous activated carbon cathode having only one surface exposed to said gaseous mixture, said cathode having a spinel type catalyst in the pores and surfaces thereof and having a voltage against zinc of at least 1.2 volts, an alkaline electrolyte and an anode comprising finely divided anodic particles having a voltage between 1.4 volts and 1.2 volts with respect to zinc, said alkaline electrolyte being immobilized between and in contact with said anode and said cathode; and means associated with said container for passing said gaseous mixture into contact with the exposed surface of said cathode.

9. In an oxygen analyzer circuit including a load resistance, an oxygen-depolarized cell which is capable of sensing the concentration of oxygen in a gaseous mixture and further characterized by an output voltage of only a few millivolts when oxygen depolarized, which cell comprises a container and in said container, a porous activated carbon cathode having only one surface exposed to said gaseous mixture, said cathode having a spinel type catalyst in the pores and surfaces thereof and having a voltage against zinc of at least 1.2 volts, an alkaline electrolyte and an anode comprising finely divided anodic particles having a voltage between 1.4 volts and 1.2 volts with respect to zinc but slightly lower than the cathode voltage when said cell is electrically connected across said load resistance and said cathode is being oxygen depolarized, said alkaline electrolyte being immobilized between and in contact with said anode and said cathode; and means associated with said container for passing said gaseous mixture into contact with the exposed surfaces of said cathode.

References Cited by the Examiner
UNITED STATES PATENTS

| | | | |
|---|---|---|---|
| 2,175,523 | 10/1939 | Greger | 136—86 |
| 2,526,692 | 10/1950 | Ruben | 136—115 |
| 2,615,931 | 10/1952 | Hatfield | 136—86 |
| 2,669,598 | 2/1954 | Marko et al. | 136—122 |
| 2,902,530 | 9/1959 | Eisen | 136—106 |
| 2,913,511 | 11/1959 | Grubb | 136—86 |
| 2,938,064 | 5/1960 | Kordesch | 136—86 |
| 3,012,086 | 12/1961 | Vahldieck | 136—86 |
| 3,043,898 | 7/1962 | Miller et al. | 136—86 |

References Cited by the Applicant
UNITED STATES PATENTS

| | | |
|---|---|---|
| 520,120 | 5/1894 | Northrup. |
| 931,081 | 8/1909 | Perry. |
| 2,278,248 | 3/1942 | Darrah. |
| 2,531,747 | 11/1950 | Stearn. |
| 2,540,674 | 2/1951 | Jacobson. |
| 2,924,634 | 2/1960 | Fischbach et al. |

JOHN H. MACK, *Primary Examiner.*

WINSTON A. DOUGLAS, *Examiner.*

T. H. TUNG, *Assistant Examiner.*